Jan. 16, 1962  E. L. BARRETT  3,017,449
QUICK ACTIVATING BATTERY
Filed March 6, 1957  3 Sheets-Sheet 1
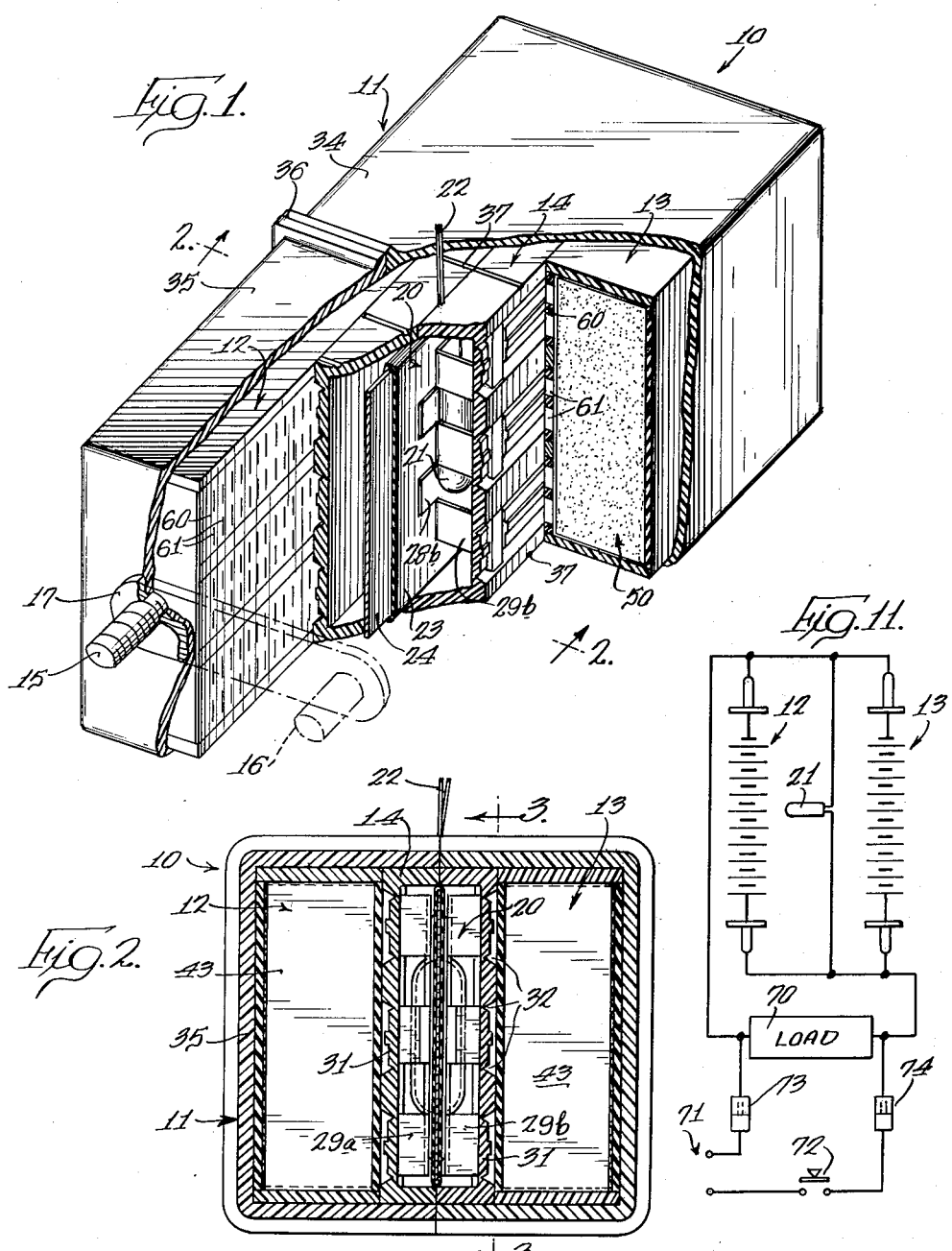
INVENTOR.
Edward L. Barrett
BY
Carlson, Pitzner, Hubbard & Wolfe
Attys.

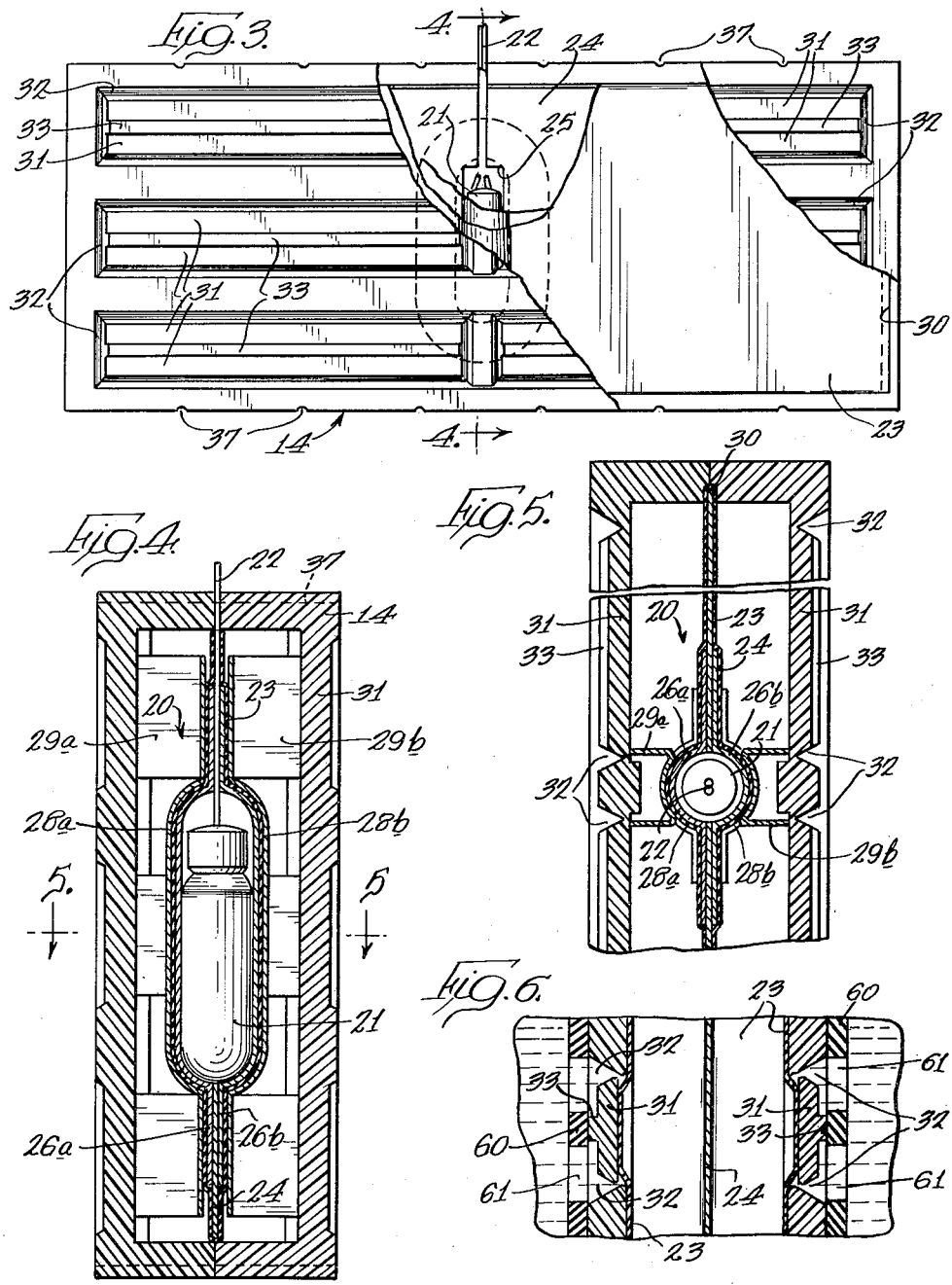

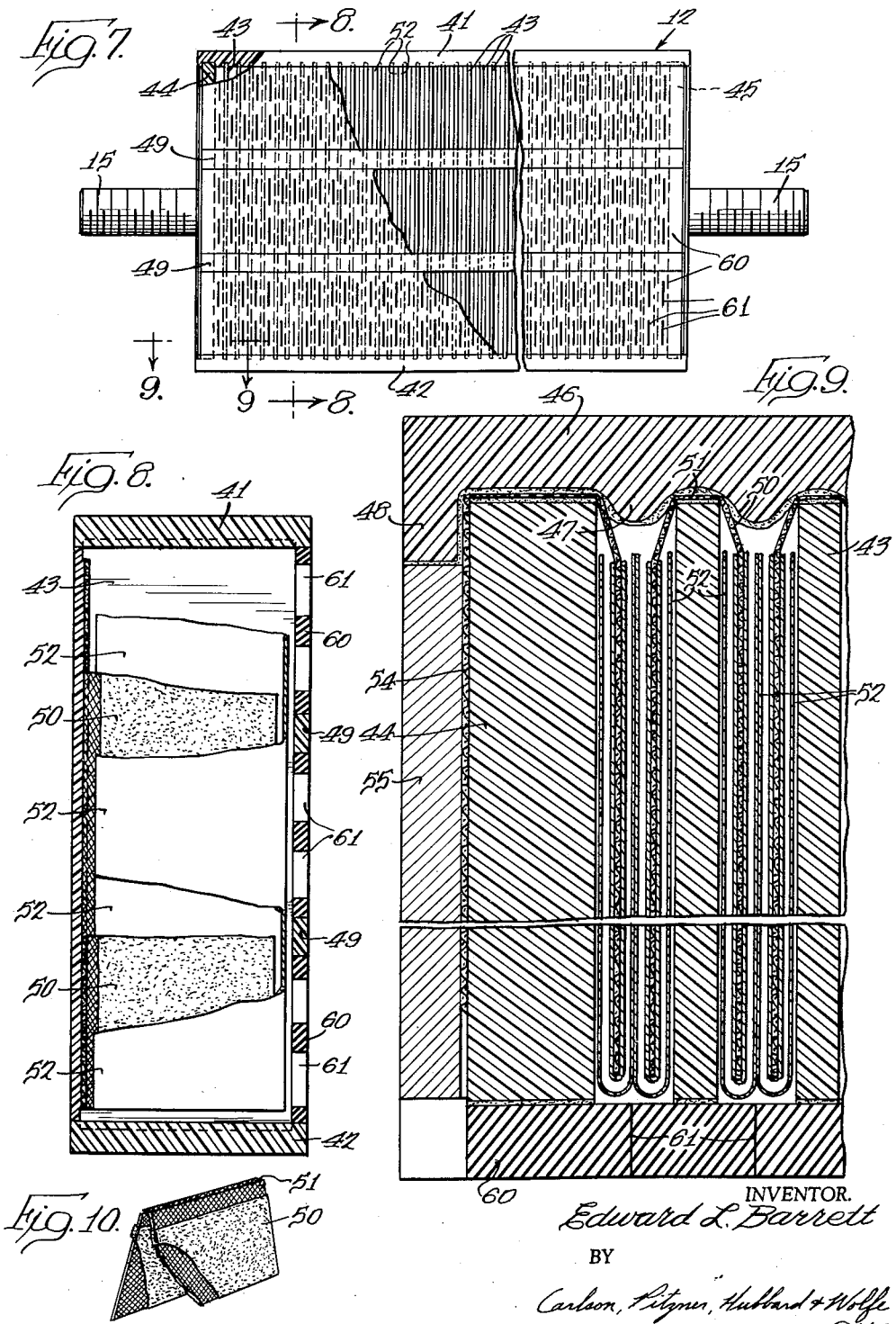

United States Patent Office 3,017,449
Patented Jan. 16, 1962

3,017,449
QUICK ACTIVATING BATTERY
Edward L. Barrett, La Grange, Ill., assignor to Donald B. Alexander, Edgar R. Bourke, Ernest W. Schneider, and Lee J. Gary, as trustees
Filed Mar. 6, 1957, Ser. No. 644,402
16 Claims. (Cl. 136—90)

The present invention relates to electrical batteries and more particularly to a quick activating high output battery.

Batteries capable of delivering a great deal of power for short periods of time have become essential in the design and construction of the various so-called "guided missiles," and have also found great utility in other applications, both military and civilian. Such batteries are commonly characterized by quite rapid decomposition once they are activated, and this disadvantage is a substantial problem when it is desired to hold equipment in readiness for instant operation over long periods of time.

As an example, one of the most successful batteries of this type employs plates of zinc and silver in an electrolytic solution of potassium hydroxide, and it has been found that a commercial battery using these elements has very short storage life. That is, when the battery is activated by supplying potassium hydroxide electrolyte to the silver and zinc plates, the battery must be used within one or two days or else replacement becomes necessary. It, therefore, becomes apparent that devices dependent upon such batteries cannot be kept in place for instant readiness but require a significant time lapse before they are ready for use, during which electrolyte is supplied to the battery cells and the activated battery installed in the device. Then, if the device is not called into action within a short time, the activated batteries must be replaced by new ones resulting in the complete loss of the old batteries and a substantial operating expense.

It is the general aim of the invention to provide a high output battery that may be quickly activated and which avoids the difficulties referred to above.

It is an object of the invention to provide a battery of the above type containing non-activated cells and a separate but integrally contained supply of electrolyte that can be controllably released to effect sudden and complete activation of the battery cells. It is a more specific object to provide such a battery with a frangible container of electrolyte and a combination of pressure and vacuum which will instantaneously distribute the electrolyte and activate the battery cells when the container is ruptured.

In more detail, it is an object to employ a frangible container that can be ruptured along predetermined lines and thus direct the electrolyte uniformly to the various cells of a multicelled battery. It is also an object to provide a novel explosive unit arranged, upon firing, to both shatter the electrolyte container and force the electrolyte into the battery cells. It is a further object to provide a battery of this type that contains and utilizes the full explosive force of its explosive activation by a novel arrangement of the frangible electrolyte container between two opposed banks of battery cells.

It is an additional detailed object to provide a battery of the above type that is self-activating when an electrical potential is momentarily applied across its terminals.

It is yet another object of the invention to provide a battery arrangement in which electrolyte is delivered from a common source or storage chamber to a plurality of battery cells and which allows overflow or reverse flow of the electrolyte incident to discharge of the battery. It is a related object to provide a battery having a plurality of cells in communication with a common electrolyte chamber but which prevents any substantial short-circuiting through the common electrolyte path. It is a more specific object to provide a novel and effective valve structure for accomplishing the foregoing.

It is still another object to provide battery plates which can be cooperatively incorporated in a battery cell structure without soldering or internal terminals of any kind and which will afford an extremely low resistance current path between adjacent cells. It is a related object to provide exceptionally compact battery cells in which the plates are completely insulated but which nevertheless may be rapidly filled with electrolyte. It is a collateral object to provide a novel plate and cell construction that permits a multicell battery having fully sealed cells to be exceptionally light and compact. It is an object related to all of the foregoing to provide a battery construction which is inherently well adapted to supply high voltages on the order of 50 to 100 volts or more.

It is yet another object to provide an outer case construction for an explosively activated battery that is light but which is sufficiently strong so as to ensure reliable operation and avoid any hazards to surrounding equipment. It is a more general object to provide a battery which is capable of meeting the most exacting of military requirements.

Other objects and advantages of the invention will become apparent upon reading the attached detailed description and upon reference to the drawings in which:

FIGURE 1 is a perspective view partially broken away of a battery constructed according to the present invention.

FIG. 2 is a transverse section taken along line 2—2 of FIG. 1.

FIG. 3 is a side view partially broken away of the electrolyte supplying assembly shown in FIG. 1.

FIG. 4 is a transverse sectional view taken along line 4—4 of FIG. 3.

FIG. 5 is a fragmentary sectional view taken along the line 5—5 of FIG. 4.

FIG. 6 is a fragmentary sectional view of the assembly shown in FIG. 3 following rupturing of the container and discharge of the electrolyte.

FIG. 7 is a side view partially broken away of one of the banks of battery cells shown in FIG. 1.

FIG. 8 is a transverse sectional view taken along line 8—8 of FIG. 7 with portions of the plate structure in a single cell broken away.

FIG. 9 is a greatly enlarged sectional view taken along line 9—9 of FIG. 7 with the spacing between the illustrated battery elements being exaggerated for the sake of clarity.

FIG. 10 is a perspective view, partially broken away, of a single battery plate panel.

FIG. 11 is a schematic wiring diagram showing a preferred installation scheme for the battery of the present invention.

While the invention will be described in connection with a preferred embodiment, it will be understood that I do not intend to limit the invention to that embodiment but, on the contrary, intend to cover such alternative embodiments and constructions as may be within the spirit and scope of the appended claims.

Turning now to FIG. 1, there is shown a battery 10 that is illustrative of the preferred embodiment of the invention. The battery has an outer sealed case 11 which snugly encloses two opposed banks of battery cells 12 and 13 and a container 14 which is filled with an electrolytic solution. Extending from each end of the banks 12 and 13 and through the outer cell case 11 are terminal studs 15 and 16 respectively. In order to electrically join cell banks 12, 13, the adjacent pairs of studs 15 and 16 are connected by terminal strips 17, only one of which appears in the drawings. In the preferred embodiment both the terminal strips 17 and studs 15 and 16 are formed of copper or the like, and the latter are threaded to permit convenient installation and connection of the battery.

In accordance with the present invention, the instantaneously self-activating battery 10 is provided with both dry, inactive battery cells enclosing spaced negative and positive plates which will form a battery upon the addition of electrolyte, and a container of electrolyte having means to controllably discharge the electrolyte from the container and into the cells. In the illustrated embodiment, to obtain the desired power output from the battery, a plurality of such dry cells are electrically associated in each of the cell banks 12 and 13, and the two banks are electrically connected. The container 14 is filled with electrolyte but is completely fluid tight so that the battery cells in cell banks 12 and 13 remain dry and inactive until the electrolyte is released. To assure that the electrolytic fluid is completely and practically instantaneously drawn into the dry cells when it is released from the container 14, the outer battery case 11 is evacuated to dispose the cell banks 12 and 13 in a hard vacuum and the case 11 is constructed to be entirely airtight. It will, therefore, be apparent that when the electrolytic solution is released from the container 14 it will flow quickly into the dry and evacuated battery cells to activate the battery.

Pursuant to the invention, the electrolytic container 14 is frangible, and an explosive unit 20 is positioned so that when it is actuated the container 14 will be ruptured and the electrolytic solution discharged to the cells. In the preferred embodiment the explosive unit 20 includes a detonating squib 21 (FIGS. 3, 4 and 5) which is submerged in the electrolyte within the container 14, and the container is formed of a frangible material such as the plastic, polystyrene. By submerging the squib 21 within the completely filled container 14, positive rupturing of the container and resulting discharge of the electrolyte is assured. This is attributed to the fact that the liquid electrolyte is substantially incompressible and thus the shock waves generated by the exploding squib 21 are suddenly and fully transmitted to the walls of the frangible container 14 so that it will rupture and allow the electrolytic solution to rush into the evacuated cell banks 12 and 13.

The detonating squib 21 is similar to the type shown in U.S. Patent 2,175,249 and may advantageously be a standard, commercially obtained product such as the Dupont Squib, S-68m. Squibs of this type are energized and exploded upon receiving an electrical impulse through the wires 22 provided as an integral part of the squib.

To prevent the gases of the explosion from entering the battery cells and also assure positive discharge of the electrolyte from the container 14, the squib 21 is sealed within an inflatable bladder 23 which is formed of a resilient, expansible material such as neoprene or rubber. When the squib 21 is detonated so that the resulting shock waves rupture the frangible container 14, the gases from the explosion inflate, but are contained within, the bladder 23 so that the inflated bladder forces electrolyte out from the ruptured container 14 but prevents the gases of the explosion from entering the battery cells and interfering with their operation.

To support the squib 21 and the surrounding bladder 23, a rigid arbor 24 is provided having a cut-out portion 25 near its center to snugly engage the squib 21, see FIG. 3. The entire arbor 24, together with the squib 21, is enveloped by the resilient bladder 23. To protect the bladder 23 from the direct explosive force of the squib 21, blast shields 26a and 26b are cupped around the squib 21 on opposite sides of the arbor 24 so as to completely shield the bladder from the direct effects of the explosion. The shields 26a, 26b, preferably formed of sheet steel, are not sealed or secured to the arbor 24 and, therefore, the gases from the exploding squib may easily pass between the shields and the arbor to inflate the bladder 23.

For the purpose of positioning the explosive unit 20 within the frangible container 14, the squib 21 is cradled between two saddles 28a and 28b, and the bladder covered ends of the arbor 24 are set in notches 30 (see FIG. 5) formed in the end walls of container 14. The saddles 28a and 28b loosely cup the portions of the bladder 23 which surround the shields 26 and 27, and have stiff arms 29a and 29b, respectively, which rigidly extend outwardly to abut the side walls of the container 14. The saddles are thus effective to firmly support the explosive unit 20 within the center of the frangible container 14.

One of the features of the invention is the division of the opposite side walls of the frangible container 14 into readily separable panels having means to prevent them, when separated, from blocking the battery cells into which the electrolyte is to be discharged. In the illustrated embodiment, each of the side walls of container 14 are provided with six panels 31, defined by deep V-grooves 32 cut into the outer surfaces of the side walls. It can be readily seen that the grooves 32 define lines of weakness along which the container 14 will readily crack under the impact of the shock waves from the exploding squib 21, so that the panels 31 will be forced outwardly and allow the electrolyte to uniformly escape along the entire length of the container 14.

In order to positively initiate rupturing of the side walls of container 14 along their grooved lines of weakness, the positioning saddles 28a and 28b perform a dual or second function. In the case of each of the saddles, the rigid arms 29a and 29b, respectively, engage the side walls of container 14 directly beneath the grooves 32 which define lines of weakness at one end of the detachable panels 31 in each side wall. It will be appreciated that when the squib 21 detonates, the saddles 28a and 28b will be driven outwardly so that their rigid arms 29a and 29b will immediately crack the side walls along the lines of weakness, and thus initiate shattering of the frangible container 14 and the resulting discharge of the electrolyte contained therein.

For the purpose of preventing a displaced panel 31 from moving outwardly under the urging of the inflated bladder 23 and blocking the openings to one of the cell banks, each panel is formed with an outer ridge 33 which, in the present instance, runs the entire length of the panel. The ridge 33 prevents a panel from seating flatly against a cell bank, as can be seen in FIG. 6, which would partially block the flow of electrolyte into the cell banks.

As a safety factor in the event that only one side wall of the frangible container 14 is ruptured following the detonation of a squib 21, the container 14 is provided with a plurality of access grooves 37 (FIG. 1) in both the top and bottom walls of the container. The access grooves permit the electrolytic solution to flow from one side of the container 14 to the other, so that both cell banks are quickly activated even when only one side of a container 14 is shattered.

In keeping with the invention, the two cell banks 12, 13 are of identical novel construction defining a plurality of battery cells, each opening toward the center of the battery 10, enabling all of the cells to be charged with electrolyte from a common source of supply. Since each of the cell banks 12, 13 are alike, only the bank 12 will be described in detail and it will be understood that the bank 13 is similarly constructed.

To form a plurality of cells in bank 12, two end walls 41 and 42 (FIGS. 7, 8 and 9) are provided in the illustrated embodiment which rigidly support a series of spaced partitions 43, thus defining a series of cells opened at their opposite sides. Preferably, the end walls 41, 42 are relatively thick and are grooved to accept and hold the partitions 43, and two end partitions 44 and 45 are provided which are thicker than the inner partitions 43 and are effective to form a rigid, box-like frame for the cell bank 12.

To close and seal the rear openings of the cells in the cell bank 12, a resilient cover 46 is provided which fits between the end walls 41, 42 and has a series of rounded ribs 47, integrally formed therewith, that protrude between the spaced partitions 43 and ensure a good seal for each cell. At each end of the cover 46, flanges 48 are formed in cover 46 to hang over and sealingly engage the edges of the end partitions 44 and 45.

Providing support for the partitions at their remaining open side are two longitudinal strips 49 which are set into suitably shaped notches formed at the end partitions 44, 45 and run the length of the cell bank.

In one practical embodiment, the end walls 41, 42, partitions 43, 44 and 45, and longitudinal strips 49 are all formed of polystyrene, while the resilient cover 46 is formed of neoprene. When using these materials, any suitable adhesive for securing and sealing the several parts may be used, for example, "Koroseal." It will be appreciated that the cell structure described above is particularly rigid and strong and thus well able to withstand the explosive shock of a detonating squib.

It should be noted that in carrying out the invention, the full explosive force which is exerted by the squib 21 to release the electrolyte is contained and utilized by sandwiching the frangible container 14 between the cell banks 12, 13. This arrangement permits the combination of hard vacuum in the cell banks and pressure from the explosively expanding bladder 23 to quickly fill the cells with electrolyte through each fractured side of the broken container, and also enables the rugged cell banks to contain and absorb the force of the explosion so that no damage is done to the outer case of the battery. It will be remembered that batteries of this type are intended to be used in conjunction with quite delicate equipment that could be severely damaged if the outer case 11 were shattered or cracked, enabling the electrolyte to leak or splatter.

The present invention is also concerned with a novel multicell battery plate structure which comprises a series of single, integral panels, each having spaced portions coated with positive and negative materials capable of producing a battery upon the addition of electrolyte, and being arrayed with the positive portion one one panel isolated in a cell with the negative portion of the adjoining panel. In the preferred embodiment each battery plate is formed of a flexible, conductive, wire gauze panel 50 (FIG. 10) folded into a U-shaped configuration to slide over one of the partitions 43 and be sealed between the partition and the cover 46. To assure a good-fluid-tight seal between the partitions 43 and the cover 46 despite the interposed gauze panel 50, the portion 51 of the panels, forming the connecting base of their U-shaped configuration, is flattened, so that the strands of wire gauze are straightened, allowing the partitions 43 and the cover 46 to flatly engage and be tightly sealed.

The gauze panels 50 have one leg coated with a positive electrically active material and the other coated with a negative electrically active material. It will thus be appreciated that when they are alined and similarly oriented over adjacent partitions 43, each individual cell between adjacent partitions will contain both a negatively and a positively coated panel portion constituting a complete battery cell.

The particular electrically active materials utilized in the preferred form of the invention are zinc and divalent silver. One method of depositing coatings of zinc and silver on battery plates of this type can be seen by reference to copending application Ser. No. 442,696, filed July 12, 1954, now Patent No. 2,886,620. Alternately, it has been found that both zinc dust and divalent silver are comemrcially available, the latter under the trade name "Divasil," so that a paste formed by adding a suitable binder to these commercially available products can be simply and easily spread onto the strips of wire gauze to form the panels 50. It has been found that a suitable binder for this purpose is a water solution of carboxy methyl cellulose. The preferred electrolyte, when utilizing zinc and divalent silver plates, is potassium hydroxide.

The use of folded panels of wire gauze for the battery plates in the cell banks 12 and 13 is particularly advantageous for several reasons. The open mesh gauze provides a particularly receptive surface for securely holding the electrically active coatings. The folded panels also eliminate the necessity for internal terminals of any kind in the multicelled battery structure, and the full-width strip of flattened gauze 51 provides an exceptionally low-resistance connection between adjoining cells. The stacked arrangement of the plates enables high voltage to be readily obtained, for example 100 volts in the battery disclosed.

In order to insulate the dissimilar plates in each of the cells, the coated portions of adjacent panels 50 are separated by strips of porous, inert, non-conductive paper. A product which has been found to be particularly useful in this regard is unwoven, regenerated rayon, such as that obtainable under the trade name "Viskon," although any similar material may be utilized. To assist in instantaneously activating the battery, the strips of insulating paper 52 are U-folded about the coated portions of the panels 50 so that when the electrolyte is released, the capillary action of the paper will assist in immediately wetting both sides of the coated panel portions.

To electrically connect the series of battery cells in the cell bank 12 to the outer terminals 15, the endmost panels 50 at each end of the cell bank are left with an uncoated portion 54, only one of which is shown, disposed on the outer sides of the end partitions 44, 45. Disposed adjacent these end portions 54, and preferably soldered thereto, are end grid plates 55, formed of electrically conductive metal, to which the terminal studs 15 are secured.

Further in accordance with the invention, check valves are provided for the individual cells of the cell banks 12, 13 which provide passages permitting electrolyte to both fill the cells for activating the battery, and be discharged therefrom incident to operation of the battery, without allowing short circuits to be set up in the common electrolyte supply. In the present embodiment the valves comprise check valve strips 60, formed of resilient material such as neoprene, which are sealed across the open sides of the battery cells and have spaced, razor-like slits 61 opening to each of the cells. The illustrated battery includes three valve strips 60, one between end wall 41 and reinforcing strip 49, a second between reinforcing strips 49 and 50, and a third between reinforcing strip 50 and end wall 42. Each of the valve strips extend the full length of the cell bank and are provided with two short slits 61 for each of the cells over which they pass.

In operation, the check valve strip 60 can easily permit the electrolyte, under the influence of the hard vacuum in the cell bank and the expanding bladder 23, to quickly pass through the slits 61 and activate the battery. It is desirable to provide sufficient electrolyte within the container 14 to completely fill all of the cells in each of the cell banks 12, 13. If less electrolyte were provided in an effort to only partially fill each of the cells, there can be no assurance that the electrolyte would be equally distributed, and a condition could well exist where some cells are completely filled and others receive no electrolyte whatsoever.

Since the cells are completely filled when the battery is activated, small amounts of electrolyte will be continuously expelled from each of the battery cells as the battery is discharged. This is attributed to the heat inherently generated within the battery as it discharges, expanding the electrolyte and forcing it back through the valve slits 61 and out of the battery cells. The expelled electrolyte soon forms a pool common to each of the battery cells and consituting a potential direct short-circuiting link throughout the entire battery. It has been found, however, that actual internal short-circuiting through the common pool of electrolyte is negligible or non-existent when the check valve strips 60 are utilized. This is apparently due to the difficulty or impossibility of setting up an ion-conducting electrolytic flow through the valve slits 61 once the pressures on each side of the check valve have been equalized. Check valve strips 60 thus provide free ingress and egress to and from the battery cells when pressure is exerted on the electrolyte, but restricts electrolytic communication after the pressures have been equalized so as to prevent internal short-circuiting of the battery.

As a feature of the invention, and in order to further the strength and safety of the battery, the outer case 11 is formed of two integral cup-shaped shells 34 and 35 joined along a seam 36. The plane of the seam 36 is at right angles to the exposive force of squib 21 which ruptures the opposite side walls of the frangible container 14. Thus, the explosive force does not tend to separate the shells 34 and 35, and this factor enables the outer case 11 to withstand the considerable internal force without springing a leak along the seam 36.

Another one of the features of the invention concerns the arrangement for remote activation of the battery 10. When it is installed for use in the illustrated embodiment, the squib 21 is connected in parallel to the cell banks 12, 13, as can be seen in FIG. 11, while the cell banks 12 and 13 are connected to the load or apparatus to which they are to supply power. A circuit 71 including a pushbutton 72 and detachable connections 73, 74 are provided to initially provide power to the load 70 and simultaneously energize the squib 21. It can thus be seen that the same circuit which is utilized by the battery to conduct power to the desired load is also utilized for energizing the squib and thus activating the battery.

To illustrate the performance capabilities of batteries constructed according to the present invention, the specifications of an exemplary battery designed particularly for use in an electric torpedo or guided missile will be briefly discussed. The exemplary battery occupies only 54 cubic inches, being six inches long and three inches square at each end. By utilizing the novel cell construction and battery plate formation disclosed herein, this battery has been made to include 60 separate cells in each of the two cell banks, or a total of 120 cells. Utilizing zinc and divalent silver as the active plate materials and potassium hydroxide as the electrolyte, a power output of 400 watts for a period of twelve minutes or 800 watts for a period of five minutes can be achieved.

Of great importance, however, is the fact that the exemplary battery can be installed and wired within the apparatus with which it is to be used and left indefinitely in place. Whenever it is desired to use the apparatus, the battery can be instantaneously activated to supply the required power.

I claim as my invention:

1. In an instantaneously activatable battery having a plurality of adjacent dry, non-activated cells, a container for controllably discharging electrolyte to the battery cells comprising, in combination, a frangible, sealed case mounted adjacent said cells, said case having lines of weakness extending across said plurality of cells, an expandable bladder positioned within said case, and an electrolytic solution filling the remainder of said case, said bladder when expanded being effective to fracture said case along said lines of weakness and discharge the electrolyte simultaneously into said cells.

2. In an instantaneously activatable battery having a plurality of adjacent dry, evacuated cells, a container for controllably discharging electrolyte to the battery cells comprising, in combination, a frangible, sealed case mounted adjacent said cells, said case having lines of weakness extending across said plurality of cells, an expandable bladder positioned within said case, and an electrolytic solution filling the remainder of said case, said bladder when expanded being effective to fracture said case along said lines of weakness and release the electrolyte to each of the cells simultaneously, the vacuum in the cells and the pressure of the bladder instantaneously forcing the electrolyte into the cells and thus activating the battery.

3. In a frangible container adapted to sealingly enclose a quantity of substantially incompressible material for discharge upon the fracturing of said container by internal pressure, an explosively expansible unit for inclusion in said container to create said pressure when desired, comprising, in combination, a rigid member having an opening near its center, an explosive squib supported within said opening, an elastic bladder tightly surrounding said member and squib, said squib, when ignited, being effective to transmit a shock wave through said material to fracture said container and said bladder being expandable to fill said container and force said material out when the bladder fills with the gas from the exploded squib.

4. In a frangible container adapted to sealingly enclose a quantity of substantially incompressible material for discharge upon the fracturing of said container by internal pressure, an explosively expansible unit for inclusion in said container to create said pressure when desired comprising, in combination, a rigid arbor in the form of a flat plate having an opening near its center, an explosive squib supported within said opening, an elastic bladder tightly surrounding said arbor and squib, and means for centering said arbor in said container including grooves formed in the inner walls of said container into which the flat arbor can be received, said squib, when ignited, being effective to transmit opposed shock waves outwardly through said material to fracture said container and said bladder being expandable to fill said container and force said material out when the bladder fills with the gas from the exploded squib.

5. In a frangible container adapted to sealingly enclose a quantity of substantially incompressible material for discharge upon the fracturing of said container by internal pressure, an explosively expansible unit for inclusion in said container to create said pressure when desired comprising, in combination, an explosive squib, means for supporting said squib submerged in said material within the container, an elastic bladder tightly surrounding said squib, said squib, when ignited, being effective to transmit a shock wave through said material to fracture said container and said bladder being expandable to fill said container and force said material out when the bladder fills with the gas from the exploded squib.

6. A self-activating battery comprising, in combination, a sealed case having positive and negative terminals projecting therethrough, a cell contained within said case having battery plates electrically connected to said terminals but free of electrolyte, a supply of electrolyte for activating said cell and separately enclosed within said case, and an electrically energized means for discharging said electrolyte into said cell and thus activating said battery, said means being electrically connected to said terminals so that a momentary surge of current through said battery will energize said means and thus activate the battery.

7. A self-activating battery comprising, in combination, a sealed case having positive and negative terminals projecting therethrough, a cell contained within said case having battery plates electrically connected to said terminals but free of electrolyte, a supply of electrolyte for activating said cell and separately enclosed within said case, an explosive charge for discharging said electrolyte into said cell and thus activating said battery, and a fuse for said charge electrically connected to said terminals so that a momentary surge of current through said battery will energize said fuse and thus activate the battery.

8. An instantaneously activatable battery comprising, in combination, a sealed case, two opposed and alined banks of battery cells supported on opposite sides of said case with the cells opening inwardly, a container enclosing a supply of electrolyte sandwiched between said banks, said container having frangible walls adjacent each bank of inwardly opening cells, and explosive means within said container to fracture said frangible container walls and discharge the electrolyte outwardly into the cells of each bank.

9. An instantaneously activatable battery comprising, in combination, a sealed case, two opposed and alined banks of battery cells supported on opposite sides of said case with the cells opening inwardly, said banks being evacuated to dispose the cells in a hard vacuum, a container enclosing a supply of electrolyte sandwiched between said banks, said container having frangible walls adjacent each bank of inwardly opening cells, and explosive means within said container to fracture said frangible container walls and discharge the electrolyte outwardly so that it is rapidly drawn into the evacuated cells of each bank.

10. An instantaneously activatable battery comprising, in combination, a sealed case, two opposed and alined banks of battery cells supported on opposite sides of said case with the cells opening inwardly, said banks being evacuated to dispose the cells in a hard vacuum, a container enclosing a supply of electrolyte sandwiched between said banks, said container having frangible walls adjacent each bank of inwardly opening cells, explosive means within said container to fracture said frangible container walls and discharge the electrolyte outwardly so that it is rapidly drawn into the evacuated cells of each bank, and means providing fluid conduits interconnecting the opposite sides of said container for equalizing passage of electrolyte into the two banks of cells in the event of unequal discharge of electrolyte from the opposite sides of said container.

11. In a battery utilizing a liquid electrolyte, the combination comprising a spaced series of alined cells containing negative and positive plates, each of said cells having openings facing in the same direction and lying in a plane, and a resilient valve plate secured across said openings to seal said cells, said valve plate having a series of slits therethrough with at least one slit disposed over each opening so that electrolyte can be forced through the slits to fill the cells and can overflow from the cells back through the slits with the resiliently closed slit preventing the setting up of an ion-conducting path which would short circuit the cells.

12. In a battery utilizing a liquid electrolyte, the combination comprising a spaced series of insulated partitions sealed between laterally spaced end plates, a compound plate folded over each of said partitions with one arm formed with dry positive and the other with dry negative materials capable of producing a battery upon the addition of electrolyte, a sealing plate sealed between said end plates and to the partitions over the folds of said compound plates to thus form a series of cells having openings facing in the same direction and lying in a plane, and a resilient valve plate secured across said openings to seal said cells, said valve plate having a series of slits therethrough with at least one slit disposed between each pair of adjoining partitions so that electrolyte can be forced through the slits to fill the cells and can overflow from the cells back through the slits with the resiliently closed slit preventing the setting up of an ion conducting path which would short circuit the cells.

13. A cell structure for a high output battery comprising, in combination, two spaced side walls, a series of alined, spaced partitions extending between said side walls and sealed thereto to form cells open at opposite ends, a series of electrically conductive plates folded over each of said partitions and having arms extending into adjacent cells, said arms alternately having negative and positive electrically active material thereon so that each cell and each plate has one negative arm and one positive arm, a resilient cover extending between said side walls and overlying the folds of said plates, said cover having ridges to fit between said partitions and thus seal one open end of said cells, and a valve plate covering the other open end of said cells.

14. An instantaneously activatable battery comprising, in combination, an elongated bank of cells containing negative and positive plates, an elongated frangible container for holding electrolyte and adapted to be exploded, said container being alined in parallel relation with said cells so that upon exploding, the electrolyte will be uniformly discharged into said cells, and a case for enclosing and sealing said cells and container, said case comprising two joined, hollowed portions positioned with their line of joinder perpendicular to said bank and said container so that the force of said explosion will not tend to separate said case portions.

15. A frangible unit for retaining and selectively discharging a supply of electrolyte in a quick activating battery, comprising a sealed container of shatterable material adapted to contain a quantity of electrolyte, said container having at least one wall with grooves cut therein to define displaceable panels and form lines of weakness about said panels, and each of said panels having a raised portion on their outer surfaces so that they will not seat flatly against an adjacent surface when severed along said lines of weakness.

16. A frangible unit for retaining and selectively discharging a supply of electrolyte in a quick activating battery, comprising a sealed container of shatterable material adapted to contain a quantity of electrolyte, said container having at least one wall with V-shaped notches cut therein to define displaceable panels and form lines of weakness about said panels, and an explosive unit positioned within said container for rupturing the wall along said lines of weakness so that the contained electrolyte is discharged.

References Cited in the file of this patent

UNITED STATES PATENTS

| | | |
|---|---|---|
| 2,404,144 | Riggs et al. | July 16, 1946 |
| 2,452,049 | Hauck | Oct. 26, 1948 |
| 2,502,723 | Harriss | Apr. 4, 1950 |
| 2,715,652 | Chubb et al. | Aug. 16, 1955 |
| 2,724,012 | Thompson | Nov. 15, 1955 |
| 2,727,083 | Hollman et al. | Dec. 13, 1955 |

FOREIGN PATENTS

| | | |
|---|---|---|
| 1,126,430 | France | Nov. 22, 1956 |
| 1,094,210 | France | Dec. 1, 1954 |